United States Patent
Guthrie

[15] 3,704,063
[45] Nov. 28, 1972

[54] REARVIEW MIRROR DEVICE

[72] Inventor: Charles I. Guthrie, 51 Guthrie Street, Irving, Tex. 75060

[22] Filed: Jan. 18, 1971

[21] Appl. No.: 107,371

[52] U.S. Cl. ............................... 350/302, 350/303
[51] Int. Cl. .......................... B60r 1/06, G02b 23/02
[58] Field of Search ..................... 350/301, 302, 307

[56] References Cited

UNITED STATES PATENTS

| | | | |
|---|---|---|---|
| 1,905,323 | 4/1933 | Wallace | 350/302 X |
| 1,617,270 | 2/1927 | Paul | 350/302 |
| 2,645,159 | 7/1953 | Darroch | 350/302 |
| 2,398,354 | 4/1946 | Brinkley | 350/302 |
| 3,498,696 | 3/1970 | Kirby | 350/302 |

*Primary Examiner*—John K. Corbin
*Attorney*—Richards, Harris & Hubbard

[57] ABSTRACT

A rearview mirror device for panel truck operators enables them to view the "blind spot" behind the truck to prevent accidents and to prevent damage to the rear of the truck when backing up. The device includes a channel running longitudinally along the center of the top exterior of the truck body. An aperture is provided in the operator's compartment of the truck through which a plane mirror is viewable by the operator. The line of sight from the operator extends from the plane mirror rearwardly through the channel to a convex mirror attached to a rear portion of the channel extending beyond the rear of the truck. In the preferred embodiment the convex mirror provides a field of view as wide as the truck which extends backwardly approximately 12 feet from the truck.

1 Claim, 6 Drawing Figures

PATENTED NOV 28 1972 3,704,063

INVENTOR
CHARLES I. GUTHRIE

Richards, Harris & Hubbard
ATTORNEYS

REARVIEW MIRROR DEVICE

BACKGROUND OF THE INVENTION

This invention relates to rearview mirror devices and specifically to an application of a rearview device for viewing the "blind spot" rearward of a motor vehicle.

The rear of panel trucks, delivery trucks and similar motor vehicles are susceptible to excessive damage. This damage is caused by the inability of the vehicle operator to see the area immediately behind the truck and extending the width of the truck. This area is normally referred to as a "blind spot". The inability to view this blind spot subjects the rear portion of such panel and delivery trucks to damage since the proximity of objects such as posts, loading docks, and the like and transient objects such as persons, other vehicles and the like can not be seen when they are near the rear of the truck. Conventional rearview mirrors normally allow an operator only to see down the sides of the truck and to within a specific distance behind the truck. This distance behind the truck is limited usually by the length of arm to which a conventional rearview mirror can be attached to a truck.

Various devices have been proposed to partially alleviate this potential damage problem. The known prior devices, however, have all had defects which render them only partially effective with respect to time or field of view. Other devices are not desirable because they are susceptible to damage themselves or occupy valuable space in such cargo carrying vehicles. Still other devices require extensive modification to the vehicle body.

It is, therefore, desirable to possess a device which will enable the operator of a vehicle having a characteristic blind spot to see the area immediately behind the truck extending the width of the truck so that it adjoins the field of view with a conventional rearview mirror and extending backwardly sufficiently far to adjoin the field of view of conventional mirrors. Alternatively, the field of view need extend backwardly only sufficiently far to enable the operator to take corrective action to prevent damage to the vehicle in the event that a potential damage situation occurs as the operator is backing the truck. It is further desirable to possess a device which will not encumber normal operating habits nor which will occupy valuable cargo space. In addition, it is desirable to possess such a device which is relatively inexpensive to produce and install and which is easy for the vehicle operator to manipulate.

SUMMARY OF THE INVENTION

The present invention, therefore, provides a rearview mirror device mountable on top of a vehicle body, which body has an aperture in the top thereof located above the driver compartment comprising a channel member mounted on the top of said body covering said aperture and extending rearwardly of said aperture, the rear portion of said channel member extending beyond the rear of said body. First mirror means is mounted in said rear portion at an angle for providing a line of sight along said channel and a field of view proximal the rear of said body extending rearwardly from said body and second mirror means positioned above said aperture in said channel member for providing a line of sight from said first mirror means along said channel to an operator in said operator compartment.

BRIEF DESCRIPTION OF THE DRAWINGS

A better understanding of the invention can be derived by a reading of the ensuing specification in connection with the accompanying drawings, wherein.

DESCRIPTION OF PREFERRED EMBODIMENT

The present invention will be described in relation to a presently preferred embodiment. Various modifications, additions, alterations, equivalents and other changes will be apparent to those of ordinary skill in the rearview mirror art after reading the specification. However, it is intended that the invention be only limited by the definition contained in the appended claims. Throughout the drawings like numerals are utilized for like components consistent with clarity and conciseness.

Figure 1:
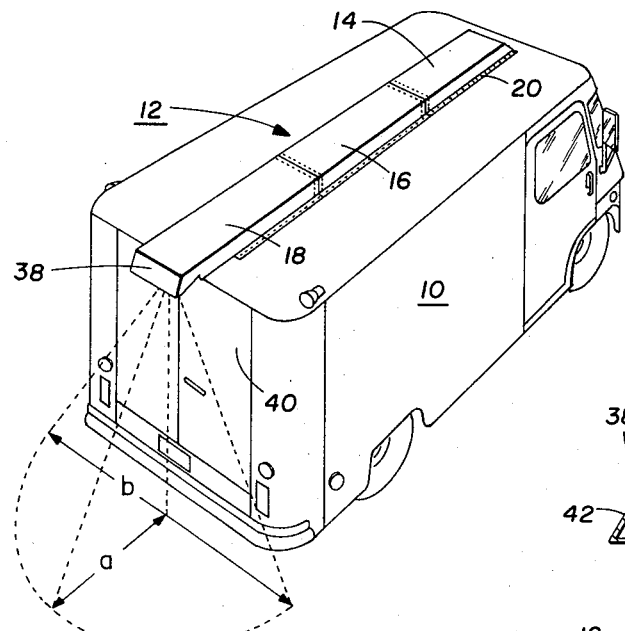
FIG. 1 is a perspective view of a vehicle body onto which the rearview mirror device of the present invention has been incorporated.
Figure 5:
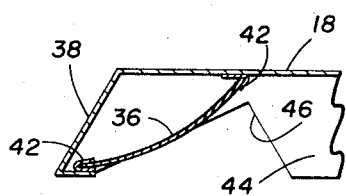
FIG. 5 is an enlarged side cross sectional view of the rear portion of the rear view mirror device; and, FIG. 6 is an enlarged view of the coupling member joining contiguous sections of the channel member employed in the rearview mirror device.
Figure 2:
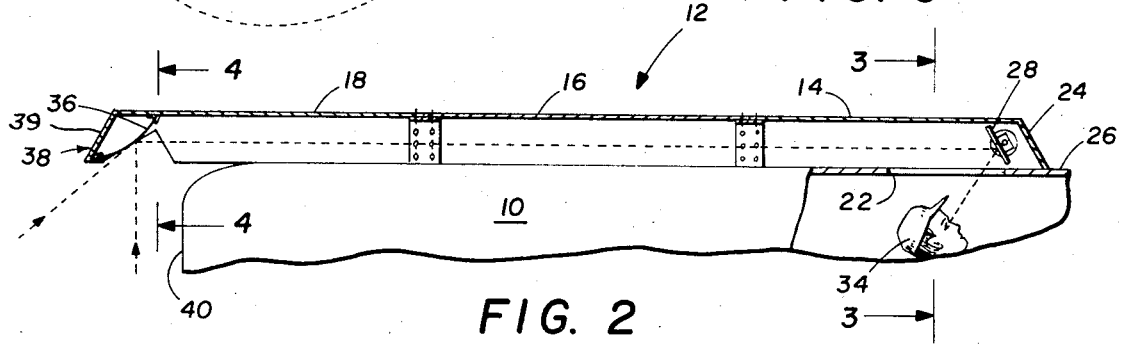
FIG. 2 is a side cross sectional view of the rearview mirror device as mounted on a vehicle body.
Figure 3:
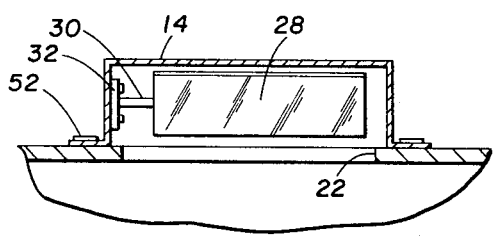
FIG. 3 is a cross sectional view of the front portion of the rearview mirror device taken along section lines 3—3 of FIG. 2.
Figure 4:
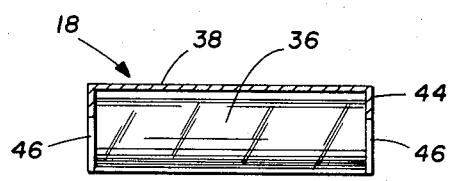
FIG. 4 is a cross sectional view of the rearview mirror device of the present invention taken along section lines 4—4 of FIG. 2.

Referring now to FIG. 1, a vehicle body generally designated 10, in the form of a panel truck usually has an area at the rear thereof to which the field of vision through conventional rearview mirrors usually located on both sides of the truck does not extend. This area, or blind spot, is designated as having a length $a$ and a width $b$ extending rearwardly of the truck. The present invention provides a means by which at least a portion of this area can be viewed by an operator of the truck 10. The invention is housed and mounted in a channel member generally designated 12. The preferred embodiment includes three channel sections, a forward section 14, an intermediate section 16, and a rear section 18. The channel member generally of an inverted U-shape is mounted to the truck body 10 by suitable fasteners 20 such as snap rivets, metal screws or the like.

Referring now conjunctively to FIGS. 1 through 5, the forward portion of the truck body is provided with an aperture 22 in the top thereof located substantially in the center of the truck body in the driver's compartment. This aperture can have, for example, a length of about 5 inches and a width of about 4 inches. The front portion 24 of the front section 14 is closed and is also fastened along its leading edge 26 to the top of the truck body.

A plane mirror 28 is located above the aperture 22 provided in the truck body. The mirror 28 is located wholly within the forward section 14 of the channel member. The plane mirror 28 is connected to, for example, a conventional universal mounting 30 (not shown in detail) which is in turn fastened by a suitable fastener through a wall 32 of the forward section 14 of the channel member. The universal mounting provides proper adjustment for the plane mirror.

The plane mirror 28 provides a line of sight from the eye of an operator 34 rearwardly along the channel 12 as shown in dotted lines to a second mirror 36 mounted in a rear portion 38 of the rear section 18 of the channel member 12. The rear portion 38 is closed in the axial direction of the channel member 12 by an angularly mounted plate member 39 and is open along the bottom portion and is mounted such that it extends rearwardly of the rear portion 40 of the vehicle body. In the preferred embodiment of the invention, the mirror 36 is a convex mirror which provides a wide field of view both laterally across the rear of the truck and extending a given distance rearwardly of the truck. As indicated in FIG. 1, the preferred embodiment of the invention provides a field of view in dimension $b$ of about 9 feet and a field of view in dimension $a$ of about 12 feet. It has been found that this field of view is sufficient to alert the operator 34 of potential danger behind the truck prior to or during the time he has reversed the motion of the vehicle. The convex mirror 36 is mounted to the rear portion 38 of the rear section 18 by a pair of brackets 42. These brackets can be provided, if desired, with a layer of cushioning material to insulate the mirror against road shocks or the like. Additionally, in most preferred embodiments of the invention the convex mirror 36 is mounted along its average plane of field of view at an angle of about 45° toward the horizontal.

The rear portion 38 of the rear channel section 18 also has portions of the side walls 44 removed to provide side apertures 46. In the preferred embodiment, these side apertures are positioned to increase the lateral field of view from the convex mirror 36 to at least as wide as the particular vehicle on which the instant device is mounted.

Figure 6:
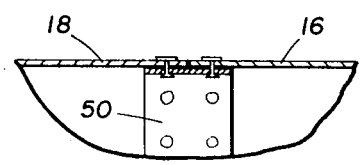

FIG. 6 illustrates the preferred means by which the plurality of channel sections 14, 16 and 18 are interconnected. This includes a coupling member 50 of generally U-shaped cross section which is fastened to contiguous sections such as 16 and 18 shown, by suitable fasteners such as snap rivets, metal screws or the like. A sealing or caulking compound or other gasket materials can be interposed the coupling member 50 and the portions of channel sections adjacent the coupling member, thus providing a weathertight seal between channel sections. In addition, such a sealing or caulking compound is utilized between the flanges 52 (FIGS. 3 and 4) and the vehicle body to provide a weathertight seal when the channel sections are fastened to the vehicle body.

As will be apparent, many additions can be made to the present preferred embodiment of this invention. For example, the intermediate channel section can be eliminated for shorter vehicle bodies. Conversely, additional intermediate or longer intermediate sections can be provided for long vehicle bodies. In addition, telescoping sections can be provided for adjustability and ease of installation. Further, the forward section of the device can be made to extend forwardly along the front of the vehicle body with the plane mirror exposed to the driver's line of sight through the front window or windshield of the vehicle. In this instance, of course, the feature of a readily adjustable plane mirror would be foregone. However, no aperture would need be provided in the roof of the vehicle body.

Additionally, a glass or other transparent covering can be provided on the bottom of the rear portion 38 of the rear section 18 of the channel member. The transparent material should be permanently and in a weathertight manner affixed to the rear channel section to prevent dust, dirt, rain and the like from entering the channel or from interfering with good reflection from the mirror surface. It has been found, however, that the normally encountered length of the channel member requires no such covering to prevent ingress of rain, dust, or dirt to the front section of the channel and consequently into the driving compart-ment through the aperture. Other alterations and additions will be apparent to those of ordinary skill in the art without depart-ing from the definition of the appended claims:

What is claimed is:

1. A rearview mirror device mountable on top of a vehicle body having an aperture in the top thereof located above the operator compartment comprising:

a flanged open bottom channel member mounted on the top exterior of said body covering and closing said aperture and extending rearwardly from the front of said body, the rear portion of said channel member extending beyond the rear of said body and being closed in the axial direction and having a downwardly facing opening located beyond the rear of said body, first convex mirror means mounted in said rear portion beyond the rear of said body at an angle for providing a line of sight along said channel and a field of view through the bottom opening in said channel member proximal the rear of said body, at least a portion of the sides of said rear portion of said channel being cut away forming side apertures located beyond the rear of said body to expose the sides of said convex mirror, and expand the lateral field of view available from said mirror, and second mirror means positioned above said aperture in the front portion of said channel member for providing a line of sight from said first mirror means along said channel to an operator in the operator compartment of said vehicle, said second mirror means comprising a plane mirror universally mounted to a bracket, said bracket fastened to a wall of said channel member.

* * * * *